H. KUPFERSCHMID.
CHANGE SPEED GEARING.
APPLICATION FILED SEPT. 26, 1907.
902,090.
Patented Oct. 27, 1908.
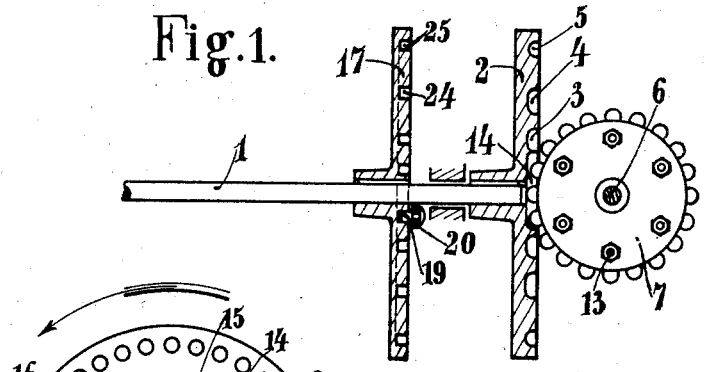
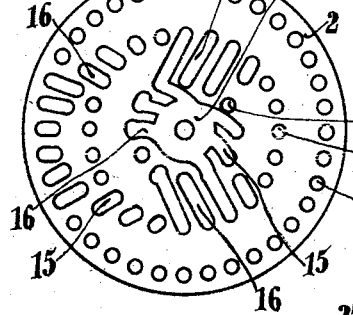
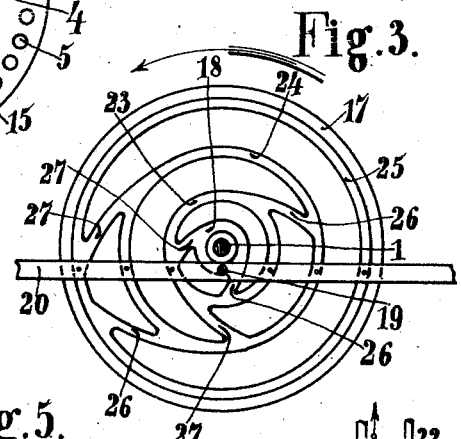
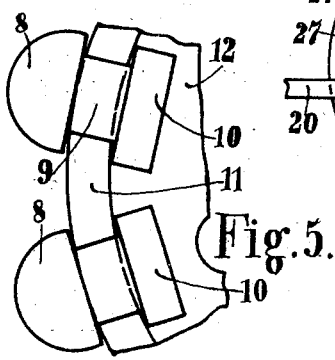
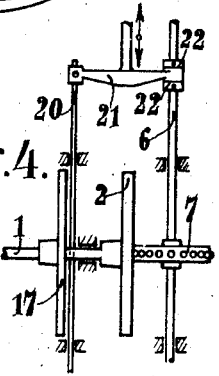
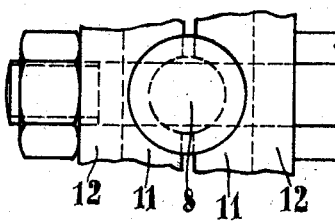
Witnesses
Frank William Pattison
Gertrude Maud Baxter
Inventor
Hans Kupferschmid
per Rayner &co
Attorneys
THE NORRIS PETERS CO., WASHINGTON, D. C.

UNITED STATES PATENT OFFICE.

HANS KUPFERSCHMID, OF BURGDORF, SWITZERLAND.

CHANGE-SPEED GEARING.

No. 902,090.  Specification of Letters Patent.  Patented Oct. 27, 1908.

Application filed September 26, 1907.  Serial No. 394,689.

*To all whom it may concern:*

Be it known that I, HANS KUPFERSCHMID, a citizen of the Swiss Federation, residing at Burgdorf, Canton of Berne, Switzerland, have invented certain new and useful Improvements in Change-Speed Gearing, of which the following is a specification.

In the change speed gear forming the present invention the driving shaft carries at one end a round disk, which has at the back several concentrically arranged rings of indentations, which are connected together by channels. Against this disk rests a toothed or star wheel movable axially with its shaft to engage in the various series of indentations in the disk. On the driving shaft is also fitted a second disk having concentric grooves at the back corresponding in position to the indentations on the first disk, and connected together by grooves corresponding to the channels of the first disk. In these grooves engages a stud fixed on a bar moving parallel to the longitudinally movable shaft, and connected to the latter so as to move with it.

In the accompanying drawings which illustrate a construction according to my invention; Figure 1 is a section through the two disks on the driving shaft; Figs. 2 and 3 are back views of the disks; Fig. 4 is a plan of the gearing; and Figs. 5 and 6 show details.

At the end of the driving shaft 1 is fitted a flat disk 2 carrying at the back rows of indentations 3, 4 and 5 arranged in concentric circles. At right angles to the driving shaft 1 a movable shaft 6 is arranged so that the axes intersect. On this shaft is fixed a toothed or star wheel 7, bearing on the disk 2. The teeth 8 of the toothed wheel 7 (Figs. 5 and 6) are of hemispherical shape and these are provided at the base of the tooth with cylindrical projections 9 (the diameter of which is smaller than that of the teeth 8), having heads 10. The disk 2 has in the center a round depression or clearance space 14 of such dimensions that the toothed wheel 7 can enter the center of the disk. The series of indentations 3, 4 and 5 are connected together and with the space 14 by means of transfer grooves 15 (Fig. 2) in such manner that with a direction of rotation such as shown by the arrows on the drawing a displacement of the toothed wheel 7 from the middle of the disk 2 can be effected to the right or to the left. The series of indentations 3, 4 and 5 together with the space 14 are also connected together by transfer grooves 16 inclined in the opposite direction, in such manner that with the direction of rotation indicated a displacement of the toothed wheel 7 from right or left towards the center of the disk can be effected. If the disk 2 rotates in the opposite direction the roles of the transfer grooves 15 and 16 are reversed.

In order that the displacement of the toothed wheel 7 and shaft 6 may always take place at the right moment and with suitable speed, the following arrangement is adopted. On the driving shaft 1 is secured a second disk 17 having in its face and towards the center a groove 18 in which a stud or pin 19 can engage, this stud being fastened to a bar 20 arranged underneath the driving shaft 1 and parallel to the shaft 6. The bar 20 is connected to a cross piece 21 having at its opposite end a bearing in which the shaft 6 rotates. On both sides of this bearing guide collars 22 are fixed on the shaft 6. Concentric to the groove 18 grooves 23, 24 and 25 are provided in the disk 17, the distances of which from the groove 18 in the direction traveled by the bar 20 are equal to the radial distances of the series of indentations 3, 4 and 5 from the space 14. The grooves 18, 23, 24 and 25 are connected together by grooves 26 (Fig. 3) corresponding to the transfer grooves 15 of the disk 2, which grooves 26 can cause, with a rotation in the direction of the arrow, the stud 19, the bar 20 and the shaft 6 with the toothed wheel 7 to move from the center of the disk 17 to right or left if the bolt 19 is brought within their reach. The grooves 18, 23, 24 and 25 are also connected by grooves 27 in the opposite direction corresponding to the transfer grooves 16, to give a movement of the stud 19 towards the center. The grooves 18, 23, 24, 25, 26 and 27 in the disk 17 may be made in the back face of the disk 2 and the disk 17 thus dispensed with.

When the gearing is used for low speeds the disk 17 and stud 19 may be omitted as in this case the movement of the toothed wheel 7 may be effected without a positive action, because the teeth of the toothed wheel 7 are forced sidewise in passing over the transfer channels.

What I claim as my invention and desire to secure by Letters Patent is:—

In a change speed gearing, the combination of a driving shaft a disk on the driving shaft having concentric rings of recesses connected by sloping transfer grooves, a sliding toothed wheel engaging in the recesses, and means for effecting the movement of the wheel consisting of a disk having concentric grooves connected by sloping channels, a sliding bar moving with the toothed wheel and a stud on the bar engaging in the grooves and moving from one to the other through the sloping channels, substantially as herein described.

In witness whereof I have hereunto set my hand in the presence of two witnesses.

HANS KUPFERSCHMID.

Witnesses:
 F. HAGLER,
 EMIL STEIGER.